Sept. 22, 1970  S. N. PANTAGES  3,529,352
THREAD CUTTING APPARATUS
Filed Oct. 24, 1966  3 Sheets-Sheet 1
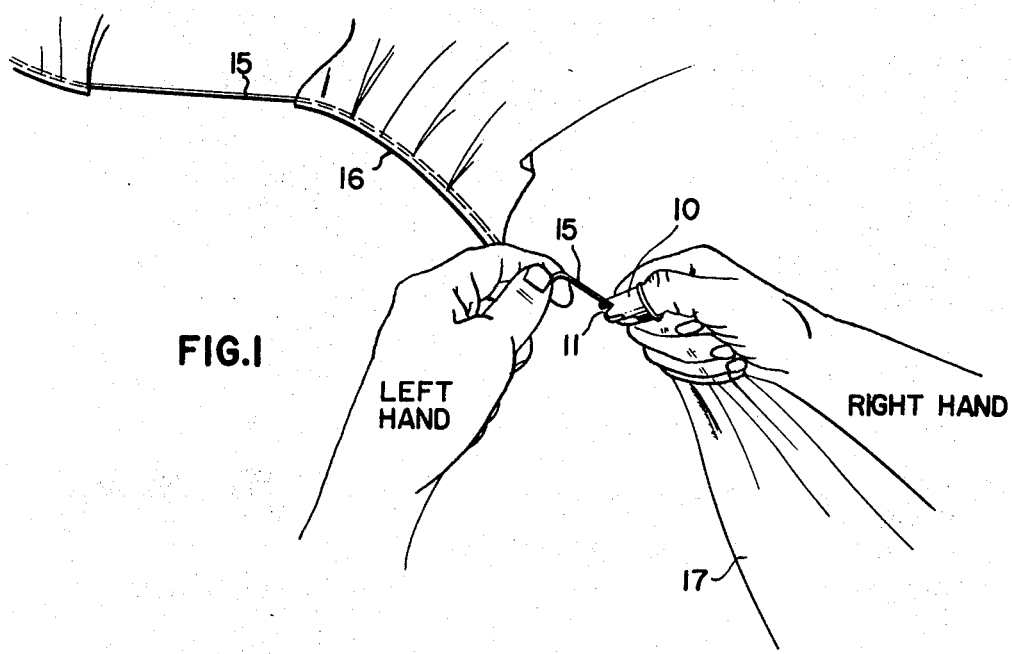
FIG.1
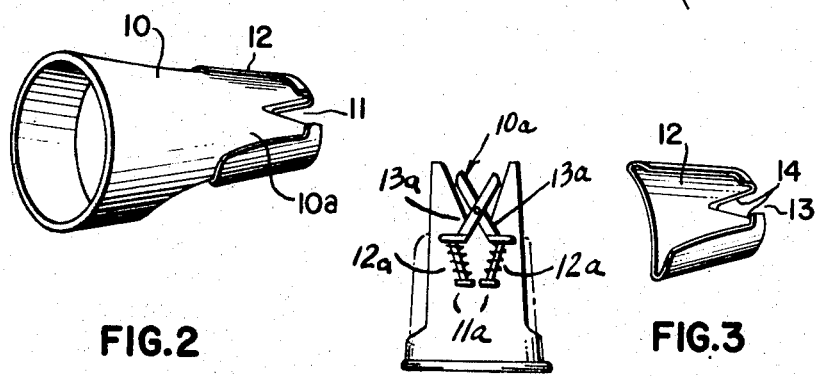
FIG.2  FIG.3
FIG.3a
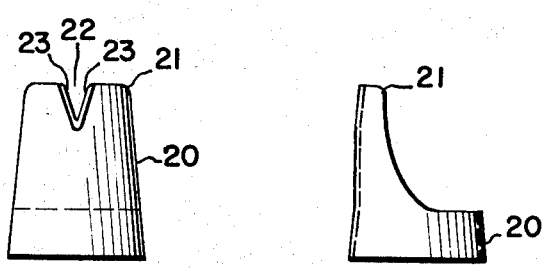
FIG.4  FIG.5
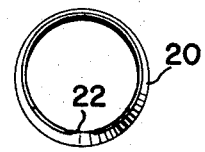
FIG.6
INVENTOR.
STEVEN N. PANTAGES
BY
ATTORNEY Sept. 22, 1970  S. N. PANTAGES  3,529,352
THREAD CUTTING APPARATUS
Filed Oct. 24, 1966  3 Sheets-Sheet 2

INVENTOR.
STEVEN N. PANTAGES
BY
ATTORNEY

Sept. 22, 1970  S. N. PANTAGES  3,529,352
THREAD CUTTING APPARATUS
Filed Oct. 24, 1966  3 Sheets-Sheet 3

INVENTOR.
STEVEN N. PANTAGES
BY
*William V. Pesce*
ATTORNEY

United States Patent Office 3,529,352
Patented Sept. 22, 1970

3,529,352
THREAD CUTTING APPARATUS
Steven N. Pantages, 228 Audubon Ave.,
New York, N.Y. 10033
Filed Oct. 24, 1966, Ser. No. 589,057
Int. Cl. B26b 27/00
U.S. Cl. 30—298                                    1 Claim

ABSTRACT OF THE DISCLOSURE

A thimble or other finger mount carrying a cutting blade for cutting thread. The cutting edge is shielded by a bracket or by the finger mount itself to prevent injury to a wearer.

---

This invention relates to cutting apparatus and is particularly directed to thread-cutting apparatus for thimbles, finger attachments and the like.

In the garment industry, in order to increase production and lower costs, the machine operator must sever garments after several have been sewn in a continuous operation. In other words, to sever the completed threaded garments one from the other, operators generally utilize their thumb nails by grasping the thread between the thumb and the forefinger of both hands and applying tension or they may use small shears. In the case of using their fingers, this is an inefficient method as well as painful and annoying to the operator. Also, sometimes infections and serious injuries may result, especially where an open wound may be contaminated with color dyes and the like. The use of shears requires the operator to either stop or to take her eyes off the work and on the shears. Further, in the case of stitching work, where a garment is being sewn or stitched accordingly, and is completed, the thread to be severed requires, as above stated, a convenient and easy way to sever and to increase production efficiency.

Applicant herein provides a novel cutting apparatus conveniently mounted to or supported by a finger, thimble and the like, and by the manipulation of the finger, the thread to be severed is easily engaged and finally cut.

It is therefore an object of the invention to apply a simple and effective thread-cutting device to fingers, thimbles and the like.

Another object of the invention is to provide thread-cutting apparatus that conveniently severs thread-connected garments without interfering with the usual mode of operation in severing and securing said garments.

Another object of the invention is to provide cutting apparatus for thread-severing in stitched garments when completed.

Another object of the invention is to provide cutting apparatus which prevents injury and annoyance to an operator and assures quick and positive severance of thread-connected garments and the like.

A still further object of the invention is to provide thread-cutting apparatus which is simple, rugged, does not interfere with other operations, efficient and reduces costs in the operation and production of making garments.

Other objects and advantages will become apparent from a reading of the specifications and a study of the accompanying drawings, and wherein:

FIG. 1 shows the manipulation and cutting of garment-connecting threads with cutting apparatus according to an embodiment of the invention.

FIG. 2 shows a finger mounting and cutting apparatus mounted thereto according to the invention.

FIG. 3 shows the cutting apparatus unmounted.

FIG. 3a shows a scissor-like cutter according to another embodiment of the invention.

FIG. 4 shows a plan view of a finger mounting and a cutting edge as a single integral unit.

FIG. 5 is a side elevation of FIG. 4.

FIG. 6 is a top view of FIG. 4.

Wherever throughout the several drawings illustrating the invention there are similar parts having similar functions, they will have the same reference numerals.

Figure 7:
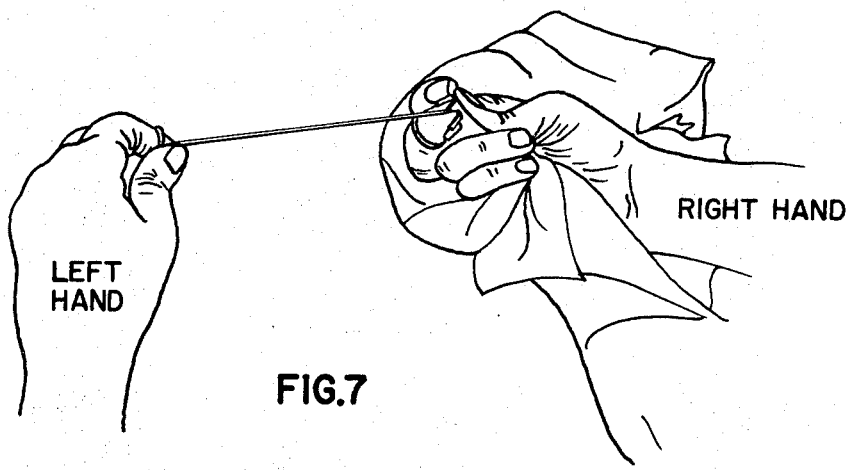
FIG. 7 shows in perspective the severing of thread in a stitched garment by the cutting apparatus according to the invention.

Now describing the invention with respect to the various figures, there is shown in particular in FIG. 2 thread-cutting apparatus comprising a finger mounting support 10 in the form of a structurally rigid conically tapering ring with an extended portion thereof 10a having a slot or recess 11 in the shape of a V and mounted thereover a replaceable jacket 12, similarly having a slot or recess 13 in the shape of a V, the said jacket bearing cutting bounding the slot 13 for the purpose of cutting threads 15. The jacket and support are so arranged as to have their V-shaped slotted portions 11 and 13, substantially aligned so as to expose the cutting edges. The connecting thread 15 connects adjacent garments 16 and 17 and is severed, as shown in FIG. 1, by the manipulation of the finger support and cutting apparatus attached thereto by a skilled operator. The operator merely depresses his finger without lifting his hand from the work as it is being moved along.

Figure 8:
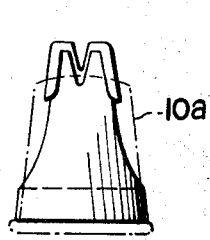
FIG. 8 shows a thimble and a mounting bracket with cutting apparatus attached thereto according to the invention.

Instead of using the mounting support 10 directly on the finger, it is possible to mount the support on a thimble 10b as shown in FIG. 8, the thimble being a convenient support for the mount and its attached cutting apparatus. Also, FIG. 3a shows a mount similar to FIG. 8, however with a scissor-like cutter mechanism 10a. In particular the cutter 10a is base supported by a pair of anchored parts 11a about which are coil springs 12a. The scissor-arms 13a are connected to the springs and undergo cutting action when a severable member is lodged between the said arms and the whole base mechanism is moved forward.

In FIGS. 4, 5 and 6 there is shown another thread-cutting article in the form of a single integrated unit comprising an annular frustoconical finger mount 20 whose extended axial portion 21 has a V-shaped recess 22 whose sides 23 are honed or sharpened to provide a cutting edge capable of severing thread upon the manipulation of the finger mount by an operator wearing same upon the second or index finger of the hand, or, some other finger whichever is the most convenient and suit able.

Figure 9:
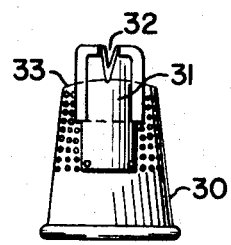
FIG. 9 shows a thimble and another type of mounting bracket with cutting apparatus attached thereto according to still another embodiment of the invention.
Figure 10:
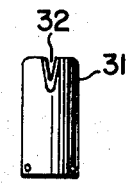
FIG. 10 shows the mounting bracket used in FIG. 9.
Figure 11:
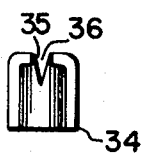
FIG. 11 shows the cutting apparatus mountable to the bracket of FIG. 10.

Another form of the thread-cutting apparatus is shown in FIGS. 9, 10 and 11, and comprises a thimble 30 having attached thereto an elongated support or mounting bracket 31. The bracket 31 is slotted at the upper end with a V-shaped recess 32 and extends partially when mounted to the thimble beyond the dome 33 of said thimble. A covering jacket 34 having likewise a V-shaped slot or recess 35 whose sides 36 are honed or sharpened to provide a cutting edge for the thread in accordance with the invention as embodied herein. The cutting jacket 34 is disposed to having its extremities bent over to conveniently and snugly fit the mounting bracket when the said jacket and bracket are attached to each other, the slotted portions of each being substantially aligned. The jacket again can be replaced with another, after substantial wear of the cutting edges thereof, thus assuring continuous use of the thimble and bracket attached thereto. It is also possible to have the bracket 31 alone, without the jacket, equipped with a cutting recess to enable cutting of the thread.

As shown in FIG. 7, after a garment has been stitched, the thread must be severed to permit the thread to operate on the next garment. Also, during a stitching process, it may be necessary on one garment to stitch at different locations so that convenient and easy thread-cutting is necessary to assure a minimum of interruption of the stitching process.

Figure 14:
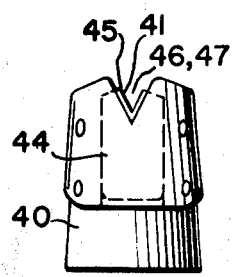
FIG. 14 shows an elevational view of a finger guard with a support bracket attached thereto and cutting apparatus carried by the guard and bracket.
Figure 15:
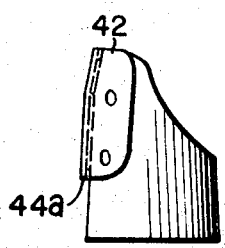
FIG. 15 shows an end view of FIG. 14.
Figure 16:
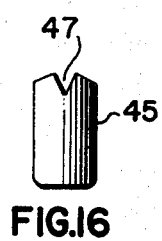
FIG. 16 shows the cutting apparatus of FIG. 14.

There is shown in FIGS. 14, 15 and 16 another embodiment of thread-cutting apparatus comprising a finger mounting support 40, of annular, approximately frustoconical shape, an axially projecting portion thereof having a V-shaped slot or recess 41. Along the outer surface of the mounting there is attached a shield 42 having a recessed area 44 to form a pocket 44a between the said mount and shield for receiving a cutting blade 45. The shield and blade each have V-shaped recesses, 46 and 47, axially extending from their extremities downward, the said slotted portions of mount, bracket and blades being aligned, the sides of said blade 45 in the recess 47 forming cutting edges for the purpose of cutting thread and the like. The cutting edges of the blade 45 is thus exposed in a radial direction in the axially open recess 46 of the shield 42. In this embodiment, the blade, as it wears, may be simply replaced by inserting a new blade in the pocket or recess 44a.

Figures 12, 13:
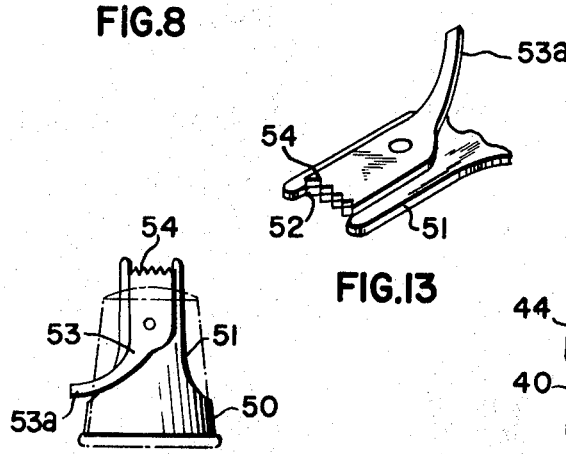
FIG. 12 shows a thimble and mounting bracket with a scissor-like cutting apparatus attached thereto.
FIG. 13 shows partially, in perspective, a portion of the mounting bracket and scissor-cutting apparatus of FIG. 12.

In the embodiments of the cutting apparatus described so far the cutting of the thread required the exertion of a certain amount of pressure or holding the thread taut to effect the said cutting. However, in FIGS. 12 and 13 there is shown still another embodiment which does not require such pressure, but only a finger manipulation as in the operation of a lever as shown in the said figure. In particular, the embodiment comprises a finger or thimble mount 50, again in the form of a frustoconically tapering ring and wherein the axially projecting portion 51 has at the extremity thereof a serrated edge 52, the edges or serrations forming one element of a pair of cutting shears. A lever or arm 53 is pivotally attached to the projection 51, the arm having a serrated edge 54. The serrations of arm and projection are moveable relative to each other, so that upon movement of the pivotally mounted arm a thread may be cut between the serrations. The movement of the arm is effected by the operator by a simple flick or movement of the finger against an extension 53a of the arm 53.

Figure 17:
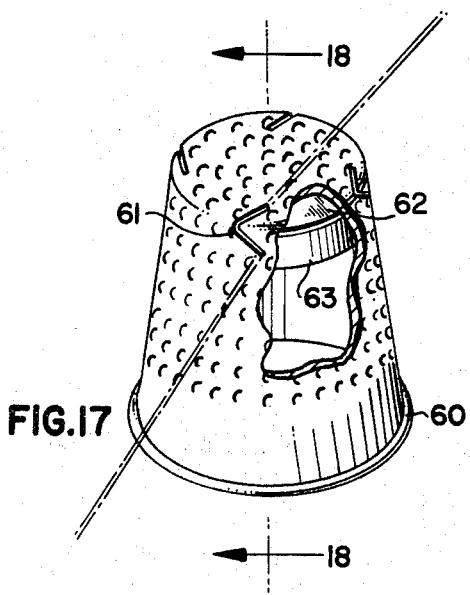
FIG. 17 is a perspective view of another embodiment of the invention shown partly broken away.
Figure 18:
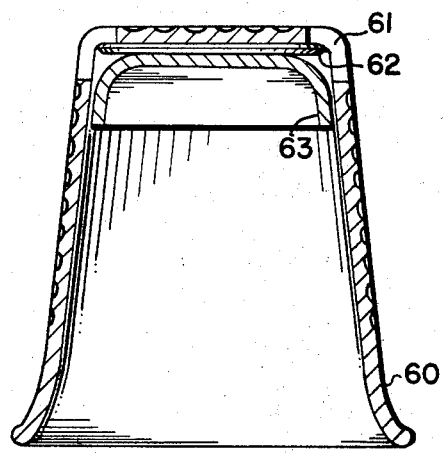
FIG. 18 is an enlarged cross-sectional view taken along the line 18—18 of FIG. 17.
Figure 19:
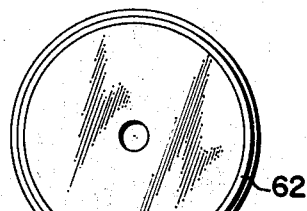
FIG. 19 is a top plan view of the blade and cup-member shown removed from FIG. 18.

FIGS. 17–22 show embodiments of the invention wherein the thread-cutting member is located within the finger support or thimble. In particular FIGS. 17–19 show a thimble 60 having a plurality of V-shaped slots 61 in the edge of its dome, the slots extending in a radial direction to permit the entrance of a thread to be severed. The severing means comprises a circular blade 62 co-axially mounted within the thimble at the upper extremity thereof so as to permit the engagement and severance of thread as the said thread is made to traverse the said slots. A semi-spherical shield 63 is internally mounted within the thimble and below the blade for holding the blade and protecting the wearer from injury from the blade. The blade and dome-shaped member 63 are attached as a single unit and removable from the thimble, as for example when the blade has to be sharpened.

Figure 21:
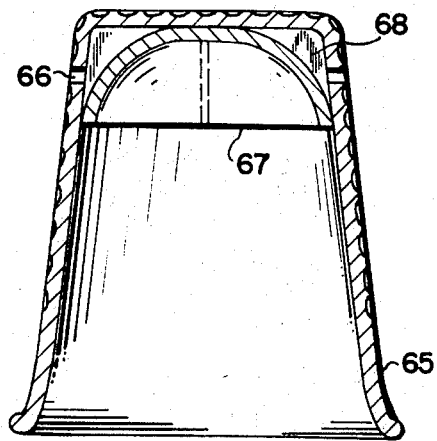
FIG. 21 is an enlarged cross-section taken along the line 21—21 of FIG. 20.
Figure 20:
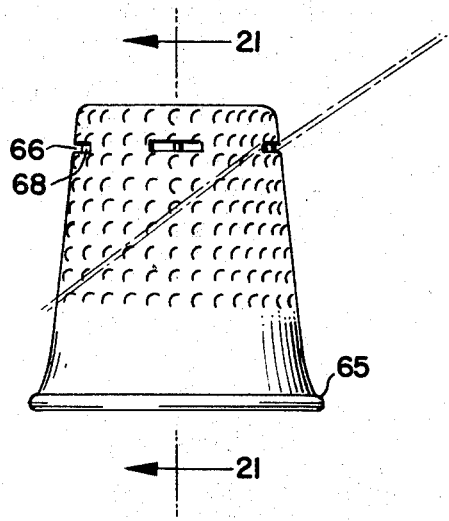
FIG. 20 is an elevational view of another embodiment of the invention.
Figure 22:
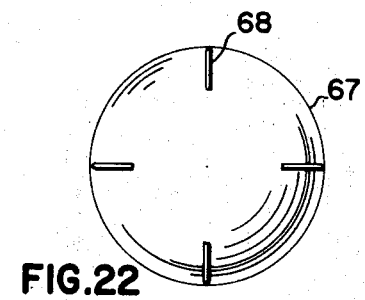
FIG. 22 is a top plan view of cup member and blades shown removed from FIG. 21.

A blade may be oriented in an axial plane as shown in FIGS. 20–22. In particular a thimble 65 has at the upper extremity thereof a plurality of spaced circumferential slots 66 along the outer periphery thereof for permitting the access of thread which is to be severed. Internal to the thimble, at the upper portion thereof, a semi-spherical hollow member 67 is attached, carrying on its outer surface a series of axially oriented blades 68, each disposed to be exposed to a slot 66 so that the traverse of any thread within the slot will permit the blade to sever the thread conveniently and efficiently.

What is claimed is:

1. A finger supported thread cutting implement comprising in combination, an annular finger mount tapered in a longitudinally outward direction relative to its position on a user's finger, a shield secured exteriorly to one side of said finger mount and coacting therewith to define a pocket which is open in said longitudinally outward direction, a cutting blade mounted in said pocket and having a transverse cutting edge oriented in said longitudinally outward direction with clearance being provided between the cutting edge and the adjacent region of the finger mount, said shield having an outer edge region provided with a longitudinally outwardly open recess in which an intermediate portion of said transverse cutting edge is exposed for engaging and cutting a thread by finger movement of the implement in said longitudinally outward direction.

References Cited

UNITED STATES PATENTS

| | | | |
|---|---|---|---|
| 124,464 | 3/1872 | Waters | 223—101 XR |
| 678,896 | 7/1901 | McIntosh | 223—101 XR |
| 967,960 | 8/1910 | Ohman. | |
| 971,186 | 9/1910 | Freitag | 30—298 |
| 993,709 | 5/1911 | Ohman. | |
| 1,000,226 | 8/1911 | Arwine | 30—298 |
| 1,091,412 | 3/1914 | Wild | 30—298 |
| 1,512,943 | 10/1924 | Martineau | 30—298 X |
| 1,858,170 | 5/1932 | Poole | 30—291 |
| 2,475,324 | 7/1949 | Jaske | 7—14.5 |
| 2,697,277 | 12/1954 | Bloxsom | 30—298 |

FOREIGN PATENTS

| | | |
|---|---|---|
| 6,060 | 4/1889 | Great Britain. |
| 118,503 | 9/1918 | Great Britain. |
| 135,791 | 12/1933 | Austria. |
| 509,392 | 10/1930 | Germany. |

ROBERT C. RIORDON, Primary Examiner

J. C. PETERS, Assistant Examiner

U.S. Cl. X.R.

7—14.5; 30—232